United States Patent

Flory

[11] 4,181,064
[45] Jan. 1, 1980

[54] HYDRAULIC BRAKE BOOSTER

[75] Inventor: Donald M. Flory, Arcanum, Ohio

[73] Assignee: General Motors Corporation, Detroit, Mich.

[21] Appl. No.: 894,146

[22] Filed: Apr. 5, 1978

[51] Int. Cl.² .................. F01B 25/02; B60T 13/12
[52] U.S. Cl. ............................... 91/6; 60/548; 60/582; 91/49; 91/431
[58] Field of Search ............ 91/5, 6, 32, 49, 431; 60/548, 582, 552, 553, 554, 404, 413, 418

[56] References Cited

U.S. PATENT DOCUMENTS

| | | | |
|---|---|---|---|
| 3,691,903 | 9/1972 | Shellhause | 91/49 |
| 3,699,680 | 10/1972 | Shellhause | 91/431 |
| 3,787,029 | 1/1974 | Shellhause | 251/333 |
| 3,879,948 | 4/1975 | Flory | 60/648 |
| 3,939,658 | 2/1976 | Horvath | 60/648 |
| 4,014,171 | 3/1977 | Kobashi | 60/547 |
| 4,075,848 | 2/1978 | Ueda | 60/548 |
| 4,135,435 | 1/1979 | Adachi | 91/49 |

Primary Examiner—Abraham Hershkovitz
Attorney, Agent, or Firm—D. D. McGraw

[57] ABSTRACT

The brake booster is connected in the hydraulic circuit containing the vehicle's power steering system. It is placed downstream of the power steering gear. A multifunctional accumulator/relief valve is provided. This valve functions as the flow restriction seat portion of the control valve to normally operate the booster, provides pressure relief to limit boost pressure to a predetermined maximum, and operates to controllably release pressure of an accumulator to the booster in the event that the power steering pump is not able to adequately perform as a pressure source for the brake booster.

6 Claims, 4 Drawing Figures ically pressure for booster operation. The booster
HYDRAULIC BRAKE BOOSTER The invention relates to a hydraulic brake booster, and more particularly to one having an accumulator for providing a back-up pressure when the primary hydraulic pressure source is not capable of furnishing sufficient hydraulic pressure for booster operation. The booster embodying the invention has a valve unit with one valve structural member having several functions. A portion of the valve structural member cooperates with a control valve element to act as a flow restriction seat for the control valve. Another portion of the valve structural member operates to controllably release accumulator pressure to operate the brake booster when there is insufficient hydraulic pressure available for booster operation from the primary pressure source. The valve structural member provides pressure relief to limit booster actuating pressure to a maximum value.

Figure 1:
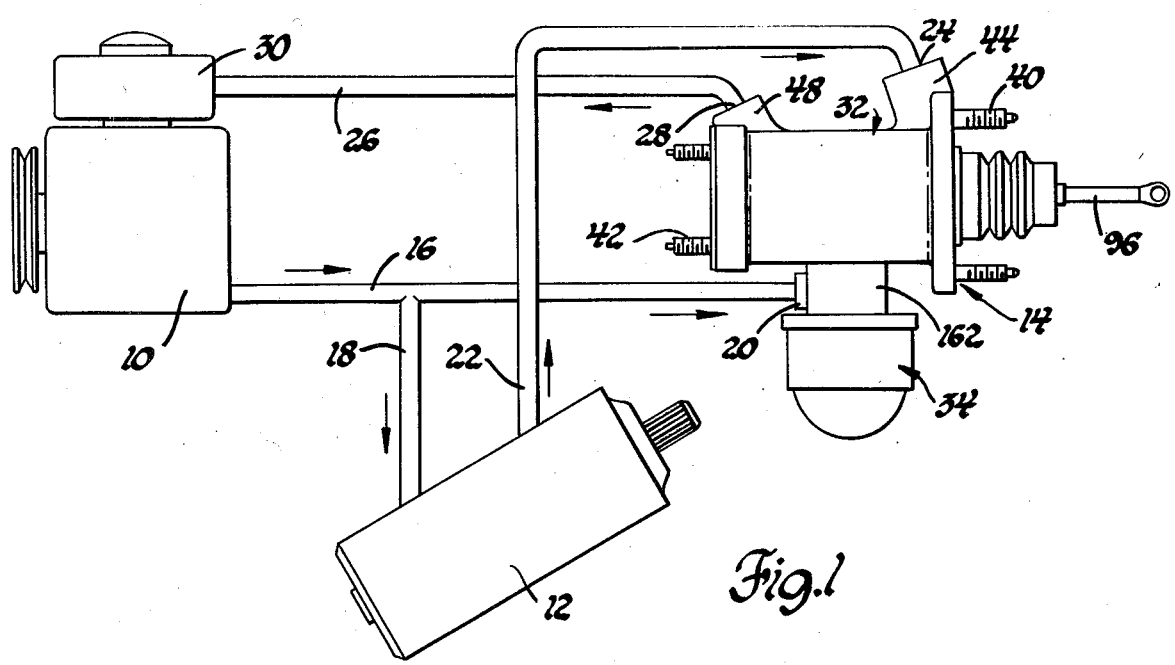
FIG. 1 is a schematic representation of a hydraulic system having a brake booster embodying the invention.

The hydraulic system of FIG. 1 includes a power steering pump 10 which is the primary source of hydraulic pressure, a power steering gear 12, a hydraulic brake booster assembly 14, and associated piping providing hydraulic fluid conduits connecting these elements. Conduit 16 delivers hydraulic fluid from pump 10 to the inlet conduit 18 of the power steering gear 12 and also to the charge inlet 20 of the booster assembly 14. Conduit 22 delivers hydraulic fluid from the outlet of the power steering gear 12 to the inlet 24 of the booster assembly 14. Conduit 26 returns hydraulic fluid from the outlet 28 of the booster assembly 14 to the reservoir 30 of the pump 10.

The booster assembly 14 includes the booster unit 32 and an accumulator 34. Booster unit 32 has a housing 36 in which a bore 38 is formed. Suitable booster mounting studs 40 are provided on one end of the housing to attach the booster assembly to a mounting bracket or other structure. Master cylinder mounting studs 42 are provided to secure a master cylinder assembly, not shown, to the other end of the booster unit 32. Booster inlet 24 is provided at boss 44. An inlet passage 46 extends through boss 44 and connects to one end of bore 38. Booster outlet 28 is located at boss 48 so that the outlet passage 50, formed through boss 48, is in fluid communication with the other end of bore 38. An end cover and spring retainer 52 closes the end of bore 38 adjacent outlet passage 50. A housing end wall 54 closes the end of bore 38 adjacent inlet passage 46. A check valve 56 is provided in inlet passage 46 to permit hydraulic fluid flow through passage 46 into bore 38 while preventing reverse flow.

A power piston 58 is reciprocably mounted in bore 38 and divides the bore into a power chamber 60, to which inlet passage 46 is connected, and an exhaust chamber 62, to which outlet passage 50 is connected. Piston 58 has spaced lands 64 and 66 joined by a piston section 68 of somewhat reduced diameter relative to the lands so that the piston and the surface of bore 38 define an annular passage 70. Seals 71 and 73 are respectively provided on lands 64 and 66 and seal against the surface of bore 38. The side 72 of piston 58 facing power chamber 60 has an axially extending section 74 extending away from piston side 72 and through an opening 76 in end wall 54. A seal 78 in opening 76 seals the power chamber 60 while permitting reciprocal movement of piston section 74 in the opening. The other end 80 of power piston 58 faces exhaust chamber 62 and also acts as a seat for one end of piston return spring 82. The other end of spring 82 is seated against end cover and spring retainer 52. Spring 82 is so preloaded that it urges power piston end wall 72 toward engagement with the housing end wall 54.

A valve plunger 84 is reciprocably mounted in a bore 86 of piston section 74 and extends into a valve chamber 88 contained within piston 58. A valve element 90 is formed on a part of valve plunger 84 and is one element of the valve unit 92. The valve chamber 88 opens into power chamber 60 through an opening 94 in which valve element 90 is positioned. Valve element 90 is somewhat smaller in diameter than opening 94. An input push rod 96 is suitably attached to valve plunger 84 for actuation by the vehicle operator to control the brake booster and apply the vehicle brakes.

The forward end 98 of valve plunger 84 is axially aligned with the reaction mechanism 100. This mechanism is mounted in a web 102 defining a part of the power piston end 80. A reaction disc 104 is positioned in a recess 106 in the forward end of web 102. A reaction piston 108 has one end reciprocably received in recess 106 and engaging the forward surface 110 of reaction disc 104. Reaction piston 108 is recessed to receive output push rod 112 therein. Push rod 112 is arranged to engage a suitable portion of the master cylinder assembly, not shown, which is actuated by the booster assembly 14. A bore 114 in piston web 102 is of smaller diameter than recess 106 and opens axially into that recess. Bore 114 also opens axially into a chamber 116 which is positioned on the other side of web 102 from exhaust chamber 62. Valve plunger end 98 is located in chamber 116. A spacer 118 is reciprocably received in bore 114 so that it substantially fills the bore radially. One end of spacer 118 engages the rear surface 120 of reaction disc 104 and the other spacer end is engageable by valve plunger forward end 98. As is well known in the art, reaction force transmitted by reaction piston 108 to reaction disc 104 is divided so that a portion of the force is transmitted to web 102 at the bottom of recess 106 and the remainder of the force is transmitted to spacer 118 and moves the spacer rearwardly. When spacer 118 engages valve plunger end 98, the portion of the reaction force transmitted to the spacer is relayed to the vehicle operator through valve plunger 84 and input push rod 96. Plunger end 98 has an enlarged section 122 which is engageable with piston web 102 upon sufficient movement of the valve plunger forwardly relative to the web. This effectively acts as a limit on the amount of reaction force transmitted through spacer 118. A spring 124 in chamber 116 abuts web 102 and a spring seat 126 on valve plunger 84. This, therefore, urges the valve plunger rearwardly and acts as a valve plunger return spring.

Opening 94 is the smallest diameter portion of a bore 127. Stepped bore portion 128 of bore 127 receives a valve sleeve 130. The next larger portion 132 of bore 127 receives a valve ring 134. A seal 136 is positioned outwardly of sleeve 130 at the rear end of ring 134 and engages bore portion 132 in sealing relation. A seal 138 is positioned on the outer surface of sleeve 130 adjacent but slightly spaced from the sleeve rear end 140. A retainer and spring seat 142 is positioned in chamber 116 and has an axially rearwardly extending portion extending into the forward end 144 of valve sleeve 130. A seal 146 is mounted within ring 134 radially between the ring and the axially extending portion of spring seat 142 and is abutted by the forward end 144 of sleeve 130. A spring 148 has one end abutting spring seat 142 and the other end abutting a shoulder formed on the inner portion of valve sleeve 130 so as to continuously urge the valve sleeve toward abutting engagement with a shoulder on piston 58 between chamber 88 and side or end wall 72. The radially inner portion of sleeve end 140 defines a valve element 150 which acts as a seat for the valve element 90 and cooperates therewith to define the booster control valve. The radially outer portion of sleeve end 140 defines a valve element 152. An axially extending recessed passage 154, extending through a part of the wall defining bore portion 128, has its rear end terminating adjacent to but spaced forwardly of the shoulder against which sleeve end 140 rests when the booster is in the released position. The rear end of passage 154 acts as another valve element 156 cooperating with valve element 152 to define a normally closed valve for controlling admission of accumulator pressure to power chamber 60. A pressure relief valve 158 is provided in a valve passage 160 extending through the rear portion of piston 58 and opening into power chamber 60. Pressure relief valve 158 is opened at a predetermined accumulator charge pressure found in annular passage 70 and radially extending passage 161 in piston 58 providing a continuous fluid communication between annular passage 70 and recessed passage 154.

A boss 162 on booster housing 36 provides for the mounting of accumulator 34 on the booster housing. A chamber 164 is formed in the boss and is continuously connected by a port 166 to annular passage 70. Chamber 164 opens through the outer end of boss 162 and is threaded to permit the attachment of accumulator 34. The accumulator includes a mounting section 168, a pressure housing 170, a support wall 172, and a ball 174 contained within the chamber 176 defined by pressure housing 170 and support wall 172. The charge inlet 20 is formed in boss 162 and opens through a check valve 178 into chamber 164. The check valve 178 will permit pressure to enter chamber 164 from the power steering pump 10 but will not permit flow from the accumulator chamber in the reverse direction. The restrictive orifice 179 in inlet 20 limits the rate of flow so that when the power steering gear is operating it will still have sufficient flow. It also acts as a bypass when the power steering gear is against the stops. Ball 174 may be of any suitable type and is illustrated as being a collapsible ball which is gaseously filled at a slight pressure. It may be a semi-solid ball with closed cells containing compressible gas, the material of the ball being compressible as pressure in chamber 176 increases. Another example of the type of ball usable is one similar to an unfuzzed tennis ball.

During normal operation of the system, the power steering pump 10 pumps hydraulic fluid through the open center type power steering gear 12 and the booster assembly 14. It can be seen that hydraulic fluid will pass from inlet 24 through check valve 56 and passage 46 to chamber 60. Valve element 90 is spaced from its cooperating seat 150 so that the fluid passes through the control valve formed by these elements with no significant flow restriction. The fluid passes into chamber 116 and through a passage 180 formed through web 102 and into exhaust chamber 62. From this chamber the fluid goes through outlet passage 50 to outlet 28 and is delivered through conduit 26 to the power steering pump reservoir 30. When either the power steering gear 12 or the brake booster assembly 14 is initially energized, a pressure buildup occurs upstream toward pump 10. Thus, a pressure increase occurs in conduit 16 and the pressure is delivered to charge inlet 20 of accumulator 34. This pressure enters chamber 164 and chamber 176 as well as annular passage 70, passage 160, and recessed passage 154. The pressure acts on ball 174 as it increases, partially collapsing the ball in accordance with the increase in pressure in chamber 176. Pressure relief valve 158 will open to limit the amount of accumulator charge pressure permitted. It will also act to limit the rate at which the accumulator is charged.

During normal operation of the booster assembly 14, push rod 96 is moved by the vehicle operator to move valve plunger 84 so that valve element 90 approaches valve element 150 to restrict flow therebetween. This results in a buildup of pressure in power chamber 60 which acts on power piston 58 to move that piston forwardly and transmit booster force to the output push rod 112 to actuate the master cylinder. If there is insufficient pressure to actuate the booster, valve element 90 engages valve sleeve 130 on the sleeve end 140 adjacent valve element 150. Further actuating movement of valve plunger 84 moves sleeve 130 against the force of spring 148 until valve element 152 opens relative to valve element 156. This permits accumulator pressure to enter power chamber 60 from chamber 176 through chamber 164, port 166, annular passage 70, passage 161, and recessed passage 154. Under this condition, the accumulator pressure acting in power chamber 60 closes check valve 56 and also moves power piston 58 forwardly to actuate the booster.

Valve sleeve 130 will also act to provide pressure relief to limit the booster actuating pressure to a maximum value. During normal booster operation when booster actuating pressure is being supplied by the power steering pump 10, the booster actuating pressure in power chamber 60 also acts on an annular surface on the sleeve end 140 of valve sleeve 130. This generates a force which is opposed by spring 148 and a lesser force generated by the same pressure acting on smaller area end 144. When the force so generated overcomes spring 148 and the lesser force, valve sleeve 130 moves forwardly until it opens bore 127 to passage 154 past valve element 152. This will relieve any excess booster actuating pressure and limit it to a maximum value.

Figure 2:
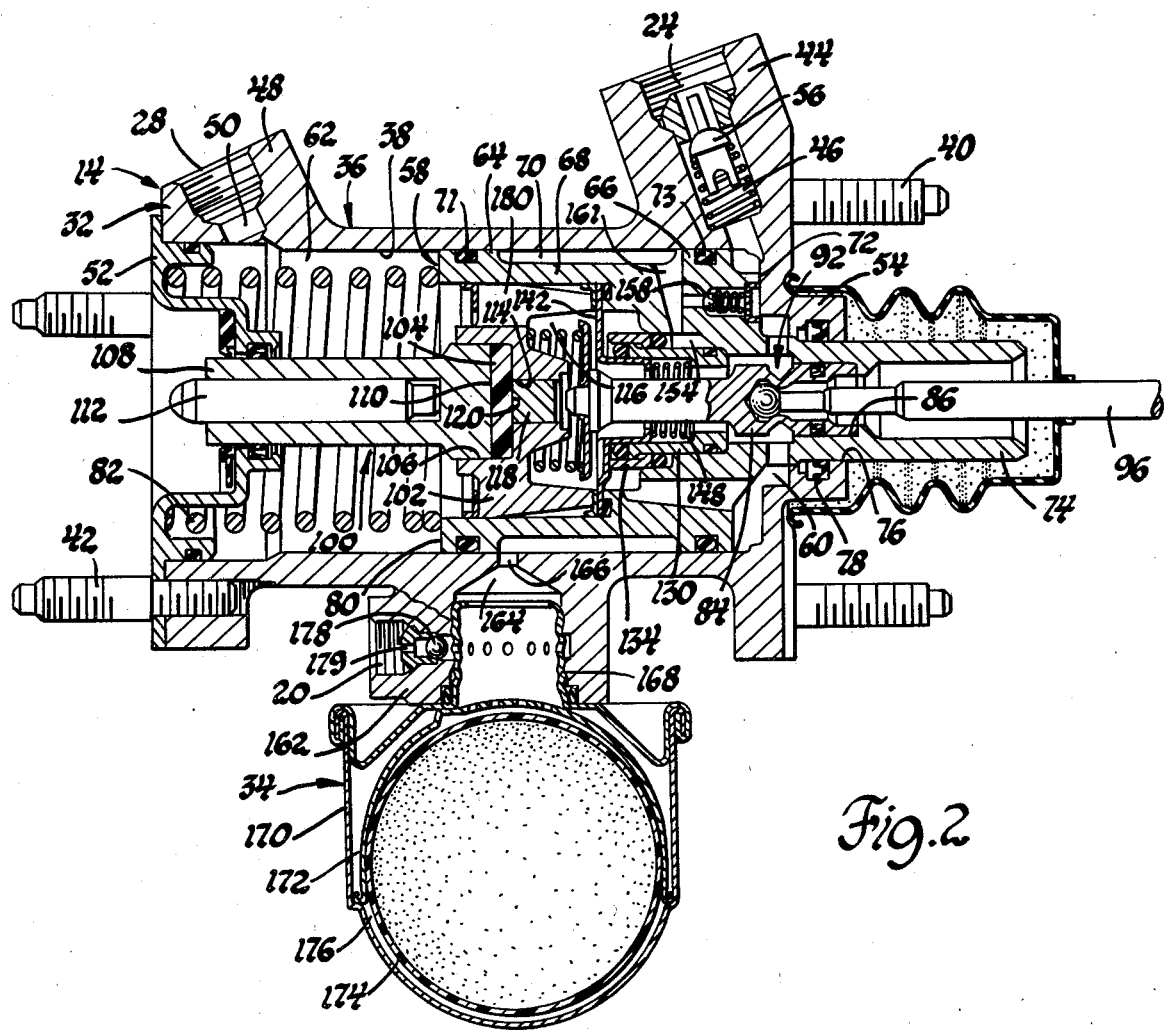
FIG. 2 is a cross section view of the brake booster of FIG. 1, with parts broken away.
Figure 3:
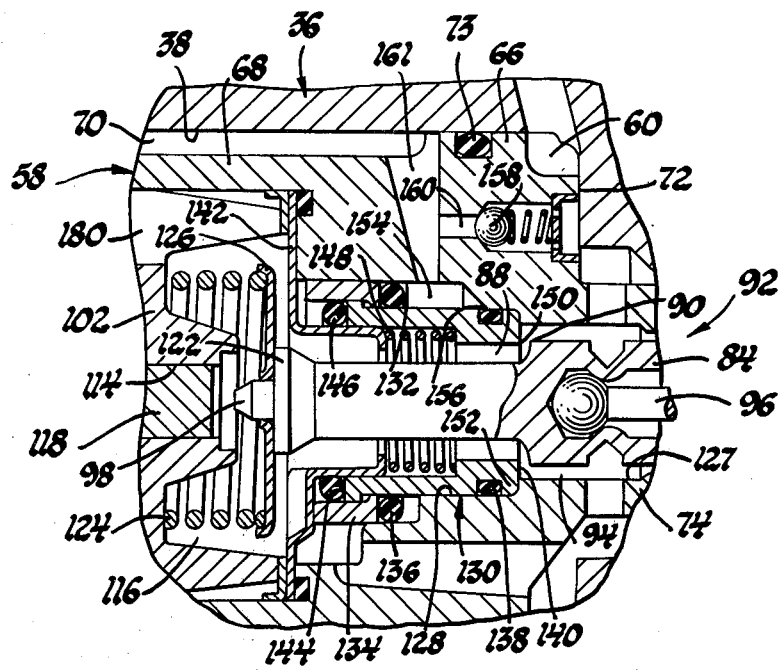
FIG. 3 is an enlarged view of the valve unit of FIG. 2.
Figure 4:
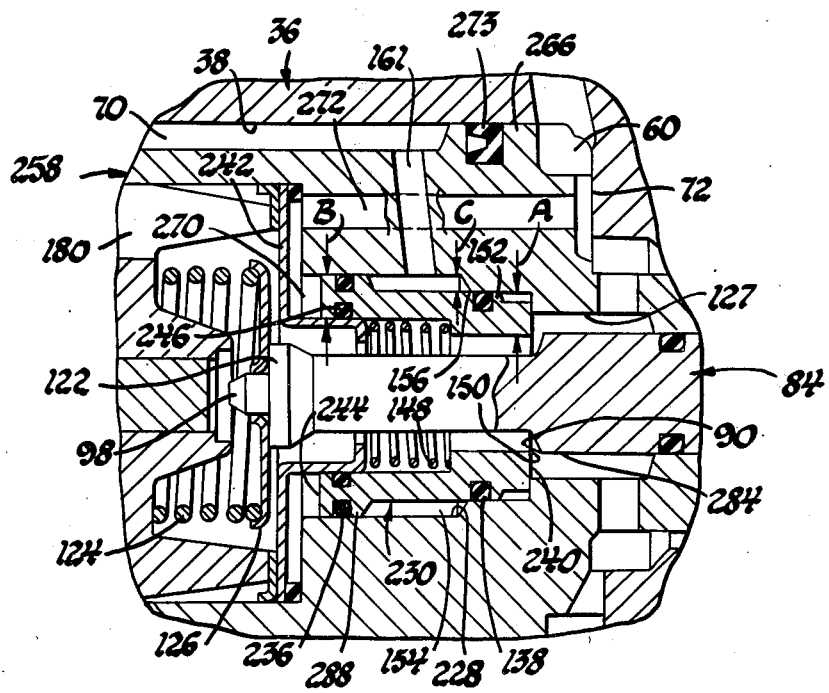
FIG. 4 is a view similar to FIG. 3 and illustrating a modified valve unit.

The modification of the valve unit illustrated in FIG. 4 has a similar valve plunger 84 with valve element 90 on land 284. A valve sleeve 230 is provided and is similar to valve sleeve 130 of FIGS. 2 and 3. The sleeve end 240 has an effective area across the annular distance A which is exposed to actuating pressure in power chamber 60. The sleeve end 244 is also exposed to booster power pressure and has an effective area B which is equal to area A. Seals 236 and 246 in land 288 adjacent sleeve end 244 respectively seal against the wall of bore 228 in power piston 258 and a portion of spring seat 242. Chamber 270 is formed by spring seat 242, a part of piston 258, and the end 244 of valve sleeve 230. Chamber 270 is connected to power chamber 60 by a passage 272. A V-block seal 273 in the land 266 of power piston 258 will permit booster actuating pressure from chamber 60 to pass along the land periphery into the annular passage 70 connected to the accumulator, when booster actuating pressure is greater than accumulator pressure, but will prevent a higher accumulator pressure from following the same path to the power chamber 60. If desired, the accumulator may be charged in this manner, eliminating the need for charge inlet 20 and check valve 178. However, this would provide accumulator charging only with booster actuation, and may not be as desirable as also charging when the steering gear is actuated. The area C defined by a portion of the valve sleeve land 288 in which seal 236 is positioned is subjected to accumulator charge pressure through passage 161. The booster run-out pressure is determined by the load on spring 148 and the area C since booster actuating pressure is ventilated to the accumulator circuit through seal 273. Areas A and B of the valve sleeve balance each other since they are exposed to the same pressure. Other portions of the valve unit are similar to that in FIGS. 2 and 3 and the same reference numerals are utilized as appropriate.

Valve sleeve 230 therefore provides valve element 150 as a seat for valve element 90, these elements comprising the booster control valve. The valve sleeve also provides for accumulator release pressure, when there is no booster power pressure available, by moving forwardly to open valve element 152 and permit accumulator pressure to enter the power chamber 60 as described above with regard to FIGS. 2 and 3. Since accumulator pressure always acts on area C against the force of spring 148, valve sleeve 230 can also be moved leftwardly by accumulator pressure to open valve element 152 to limit accumulator charge pressure to a maximum desired value. This eliminates the need for the pressure relief valve 158 in the valve unit of FIGS. 2 and 3.

What is claimed is:

1. A hydraulic booster valve unit for use in a hydraulic booster with a primary source of hydraulic pressure and an accumulator providing a secondary source of hydraulic pressure, said valve unit comprising:

a valve housing also formed as a booster power piston and having a stepped bore therein defined by a side wall and shoulders, said valve housing being adapted to receive hydraulic fluid from the primary source of hydraulic pressure on one side thereof, said one side defining a wall of a booster power chamber;

a valve sleeve reciprocably received in said bore and having one end exposed to said power chamber, said one end having an outer peripheral section forming a valve element cooperating with a first shoulder and adjacent wall portion of said stepped bore to define a first valve, and an inner peripheral edge forming a control valve seat, said valve sleeve having another end axially opposite said one end;

a first spring acting on said valve sleeve and urging said valve sleeve one end toward said first shoulder;

a valve plunger extending into said stepped bore and having a control valve element formed thereon and cooperating with said control valve seat to define a second valve, said valve plunger having a second spring urging said control valve element axially away from said control valve seat so that said second valve is an open center valve allowing hydraulic fluid to flow therethrough, said valve plunger being adapted to be moved under operator control against the force of said second spring to variably restrict and close said second valve;

said valve housing and said valve sleeve between the ends thereof defining a chamber adapted to contain hydraulic accumulator pressure;

and a third valve adapted to permit hydraulic fluid flow only in one direction between said power chamber and said accumulator pressure chamber;

movement of said valve plunger actuating said second valve and conditioning it to restrict hydraulic flow therethrough and increase pressure in the power chamber to actuate the booster, and additional movement of said valve plunger engaging said control valve element and said control valve seat in mechanical force transmitting relation and mechanically moving said valve sleeve to open said second valve to condition said second valve to admit accumulator pressure into the power chamber to actuate the booster.

2. A hydraulic booster valve unit for use in a hydraulic booster with a primary source of hydraulic pressure and an accumulator providing a secondary source of hydraulic pressure, said valve unit comprising:

a valve housing also formed as a booster power piston and having a stepped bore therein defined by a side wall and shoulders, said valve housing being adapted to receive hydraulic fluid from the primary source of hydraulic pressure on one side thereof, said one side defining a wall of a booster power chamber;

a valve sleeve reciprocably received in said bore and having one end exposed to said power chamber, said one end having an outer peripheral section forming a valve element cooperating with a first shoulder and adjacent wall portion of said stepped bore to define a first valve, and an inner peripheral edge forming a control valve seat, said valve sleeve having another end axially opposite said one end;

a balance chamber formed in said housing having said valve sleeve another end defining one wall thereof, and a passage in said valve housing communicating said balance chamber and the booster power chamber, said valve sleeve ends subtending equal and opposite areas subject to the same pressure;

a first spring acting on said valve sleeve and urging said valve sleeve one end toward said first shoulder;

a valve plunger extending into said stepped bore and having a control valve element formed thereon and cooperating with said control valve seat to define a second valve, said valve plunger having a second spring urging said control valve element axially away from said control valve seat so that said second valve is an open center valve allowing hydraulic fluid to flow therethrough, said valve plunger being adapted to be moved under operator control against the force of said second spring to variably restrict and close said second valve;

said valve housing and said valve sleeve between the ends thereof defining a chamber adapted to contain hydraulic accumulator pressure;

and a third valve adapted to permit hydraulic fluid flow only in one direction between said power chamber and said accumulator pressure chamber;

movement of said valve plunger actuating said second valve and conditioning it to restrict hydraulic flow therethrough and increase pressure in the power chamber to actuate the booster, and additional movement of said valve plunger engaging said control valve element and said control valve seat in mechanical force transmitting relation and mechanically moving said valve sleeve to open said second valve to condition said second valve to admit accumulator pressure into the power chamber to actuate the booster.

3. A hydraulic booster valve unit for use in a hydraulic booster with a primary source of hydraulic pressure and an accumulator providing a secondary source of hydraulic pressure, said valve unit comprising:

a valve housing also formed as a booster power piston and having a stepped bore therein defined by a side wall and shoulders, said valve housing being adapted to receive hydraulic fluid from the primary source of hydraulic pressure on one side thereof, said one side defining a wall of a booster power chamber;

a valve sleeve reciprocably received in said bore and having one end exposed to said power chamber, said one end having an outer peripheral section forming a valve element cooperating with a first shoulder and adjacent wall portion of said stepped bore to define a first valve, and an inner peripheral edge forming a control valve seat, said valve sleeve having another end axially opposite said one end;

a balance chamber formed in said housing having said valve sleeve another end defining one wall thereof, and a passage in said valve housing communicating said balance chamber and the booster power chamber, said valve sleeve ends subtending equal and opposite areas subject to the same pressure;

a first spring acting on said valve sleeve and urging said valve sleeve one end toward said first shoulder;

a valve plunger extending into said stepped bore and having a control valve element formed thereon and cooperating with said control valve seat to define a second valve, said valve plunger having a second spring urging said control valve element axially away from said control valve seat so that said second valve is an open center valve allowing hydraulic fluid to flow therethrough, said valve plunger being adapted to be moved under operator control against the force of said second spring to variably restrict and close said second valve;

said valve housing and said valve sleeve between the ends thereof defining a chamber adapted to contain hydraulic accumulator pressure;

and a third valve adapted to permit hydraulic fluid flow only in one direction from said power chamber to said accumulator pressure chamber;

movement of said valve plunger actuating said second valve and conditioning it to restrict hydraulic flow therethrough and increase pressure in the power chamber to actuate the booster, and additional movement of said valve plunger engaging said control valve element and said control valve seat in mechanical force transmitting relation and mechanically moving said valve sleeve to open said second valve to condition said second valve to admit accumulator pressure into the power chamber to actuate the booster.

4. A hydraulic booster valve unit for use in a hydraulic booster with a primary source of hydraulic pressure and an accumulator providing a secondary source of hydraulic pressure, said valve unit comprising:

a valve housing also formed as a booster power piston and having a stepped bore therein defined by a side wall and shoulders, said valve housing being adapted to receive hydraulic fluid from the primary source of hydraulic pressure on one side thereof, said one side defining a wall of a booster power chamber;

a valve sleeve reciprocably received in said bore and having one end exposed to said power chamber, said one end having an outer peripheral section forming a valve element cooperating with a first shoulder and adjacent wall portion of said stepped bore to define a first valve, and an inner peripheral edge forming a control valve seat, said valve sleeve having another end axially opposite said one end;

a balance chamber formed in said housing having said valve sleeve another end defining one wall thereof, and a passage in said valve housing communicating said balance chamber and the booster power chamber, said valve sleeve ends subtending equal and opposite areas subject to the same pressure;

a first spring acting on said valve sleeve and urging said valve sleeve one end toward said first shoulder;

a valve plunger extending into said stepped bore and having a control valve element formed thereon and cooperating with said control valve seat to define a second valve, said valve plunger having a second spring urging said control valve element axially away from said control valve seat so that said second valve is an open center valve allowing hydraulic fluid to flow therethrough, said valve plunger being adapted to be moved under operator control against the force of said second spring to variably restrict and close said second valve;

said valve housing and said valve sleeve between the ends thereof defining a chamber adapted to contain hydraulic accumulator pressure, said valve sleeve having an effective area exposed to said accumulator pressure chamber for generating a force acting in opposition to said first spring;

and a third valve adapted to permit hydraulic fluid flow only in one direction from said power chamber to said accumulator chamber to charge the accumulator from hydraulic pressure in said power chamber;

the force generated by accumulator pressure acting on said valve sleeve effective area overcoming said first spring at a predetermined accumulator charge pressure value to move said valve sleeve to open said first valve and prevent accumulator charge pressure from exceeding the predetermined accumulator charge pressure value;

movement of said valve plunger actuating said second valve and conditioning it to restrict hydraulic flow therethrough and increase pressure in the power chamber to actuate the booster, and additional movement of said valve plunger engaging said control valve element and said control valve seat in mechanical force transmitting relation and mechanically moving said valve sleeve to open said second valve to condition said second valve to admit accumulator pressure into the power chamber to actuate the booster.

5. A hydraulic booster valve unit for use in a hydraulic booster with a primary source of hydraulic pressure and an accumulator providing a secondary source of hydraulic pressure, said valve unit comprising:

a valve housing also formed as a booster power piston and having a stepped bore therein defined by a side wall and shoulders, said valve housing being adapted to receive hydraulic fluid from the primary source of hydraulic pressure on one side thereof, said one side defining a wall of a booster power chamber;

a valve sleeve reciprocably received in said bore and having one end exposed to said power chamber, said one end having an outer peripheral section forming a valve element cooperating with a first shoulder and adjacent wall portion of said stepped bore to define a first valve, and an inner peripheral edge forming a control valve seat, said valve sleeve having another end axially opposite said one end;

a first spring acting on said valve sleeve and urging said valve sleeve one end toward said first shoulder;

a valve plunger extending into said stepped bore and having a control valve element formed thereon and cooperating with said control valve seat to define a second valve, said valve plunger having a second spring urging said control valve element axially away from said control valve seat so that said second valve is an open center valve allowing hydraulic fluid to flow therethrough, said valve plunger being adapted to be moved under operator control against the force of said second spring to variably restrict and close said second valve;

said valve housing and said valve sleeve between the ends thereof defining a chamber adapted to contain hydraulic accumulator pressure;

and a pre-loaded check valve in a passage in said valve housing adapted to permit hydraulic fluid flow only in one direction from said accumulator pressure chamber to said power chamber to limit accumulator charge pressure; movement of said valve plunger actuating said second valve and conditioning it to restrict hydraulic flow therethrough and increase pressure in the power chamber to actuate the booster, and additional movement of said valve plunger engaging said control valve element and said control valve seat in mechanical force transmitting relation and mechanically moving said valve sleeve to open said second valve to condition said second valve to admit accumulator pressure into the power chamber to actuate the booster.

6. In a hydraulic brake booster having a housing provided with a fluid inlet and a fluid outlet, a bore in said housing having a power piston movable therein, said piston defining with said housing a power chamber on one piston side and an exhaust chamber on the other piston side, said fluid inlet being connected to receive fluid flow and pressure from a primary fluid source and having a check valve therein and opening through said check valve into said power chamber, said fluid outlet opening from said exhaust chamber, a pressure accumulator having a charge inlet connected with the primary fluid source to receive charging pressure therefrom, said charge inlet having a check valve therein, a first push rod movable to control booster operation, and a second push rod connected with said piston to transmit booster power therefrom; the improvement comprising:

a valve unit having first and second and third valve elements and including
a valve sleeve movably mounted in said piston for limited axial movement relative thereto and a valve plunger movable by said first push rod and extending axially through said sleeve and said piston, said first valve element being formed on said valve plunger, said second valve element being formed on one end of said valve sleeve and positioned to cooperate in valving relation with said first valve element, and said third valve element being formed on said piston and positioned to cooperate in valving relation with said second valve element in radially spaced relation to said first valve element;

said sleeve one end subtending a first area subject to fluid pressure in said power chamber, the other sleeve end subtending a second area smaller than said first area and also subject to fluid pressure in said power chamber to generate a force acting on said sleeve in opposition to but less than the force generated by fluid pressure acting on said first area;

and a spring acting on said valve sleeve and said piston urging said second valve element into normally closed and overlapping valve relation with said third valve element;

and passage means in said piston communicating with said accumulator and providing accumulator pressure at said second and third valve elements;

said valve plunger when moved in the booster actuating direction restricting flow between said first and second valve elements to build up a power pressure in said power chamber to move said piston and operate the booster;

said valve sleeve moving said second valve element away from said first valve element to increase the flow therebetween and consequently limit the power pressure in said power chamber to a predetermined maximum pressure when the net force generated by power pressure acting on said first and second sleeve areas overcomes the force of said spring, such valve sleeve movement being insufficient to open said second valve element relative to said third valve element due to the closed overlapping relation of said second and third valve elements;

said valve plunger moving said first valve element into engagement with said second valve element when insufficient power pressure is generated from the primary fluid source and further moving said valve sleeve to open said second valve element relative to said third valve element, permitting introduction of accumulator pressure past said second and third valve elements from said passage means into said power chamber to operate said booster.

* * * * *